(12) United States Patent
Dorenbosch

(10) Patent No.: US 7,941,143 B2
(45) Date of Patent: May 10, 2011

(54) METHOD AND SYSTEM FOR LEVERAGING AN AUTHENTICATION ON ONE NETWORK TO OBTAIN AN AUTHENTICATION ON ANOTHER NETWORK

(75) Inventor: Jheroen P. Dorenbosch, Paradise, TX (US)

(73) Assignee: Motorola Solutions, Inc., Schaumburg, IL (US)

( * ) Notice: Subject to any disclaimer, the term of this patent is extended or adjusted under 35 U.S.C. 154(b) by 964 days.

(21) Appl. No.: 11/274,461

(22) Filed: Nov. 15, 2005

(65) Prior Publication Data

US 2007/0111708 A1    May 17, 2007

(51) Int. Cl.
*H04Q 7/20* (2006.01)
*H04Q 7/00* (2006.01)
*H04M 1/66* (2006.01)
*H04M 1/00* (2006.01)

(52) U.S. Cl. .............. 455/435.1; 455/411; 455/436; 455/552.1; 370/331

(58) Field of Classification Search .......... 455/410–411, 455/435.1–435.3, 552.1, 432.1, 432.3, 436–443; 370/331; 713/153, 168; 709/217–219
See application file for complete search history.

(56) References Cited

U.S. PATENT DOCUMENTS

| | | | | |
|---|---|---|---|---|
| 5,537,474 A * | 7/1996 | Brown et al. | ................. | 380/248 |
| 5,661,806 A * | 8/1997 | Nevoux et al. | ................. | 380/247 |
| 6,769,000 B1 | 7/2004 | Akhtar et al. | | |
| 6,857,075 B2 * | 2/2005 | Patel | ............................. | 713/171 |
| 6,876,644 B1 | 4/2005 | Hsu et al. | | |
| 6,944,150 B1 | 9/2005 | McConnell et al. | | |
| 6,950,876 B2 | 9/2005 | Bright et al. | | |
| 7,110,747 B2 * | 9/2006 | Jain et al. | ...................... | 455/411 |
| 7,184,418 B1 * | 2/2007 | Baba et al. | .................... | 370/331 |
| 7,298,733 B2 | 11/2007 | Sakai et al. | | |
| 2003/0148791 A1 * | 8/2003 | Ahn et al. | ..................... | 455/559 |
| 2003/0219003 A1 * | 11/2003 | Parekh | ......................... | 370/342 |
| 2005/0021634 A1 * | 1/2005 | Naim et al. | .................. | 709/206 |
| 2006/0104252 A1 * | 5/2006 | Song et al. | .................... | 370/338 |
| 2006/0251257 A1 * | 11/2006 | Haverinen et al. | ............ | 380/270 |

FOREIGN PATENT DOCUMENTS

EP       0604911 A2    8/2002

\* cited by examiner

*Primary Examiner* — George Eng
*Assistant Examiner* — Nam Huynh
(74) *Attorney, Agent, or Firm* — Simon B. Anolick

(57) ABSTRACT

The present invention relates to a method and system of a method and system for leveraging a 3G authentication to obtain a 2G authentication for a mobile station (135) using a provisional authentication agent (140). The mobile station (135) first establishes a provisional authentication (210, 215) in the 2G wireless communication system (105) using a second set of authentication parameters and based on the provisional authentication, negotiates a 3G authentication (220) with a 3G wireless communication system (115) that the mobile station was previously operating in and had authenticated to. Using the first set of authentication parameters received from the 3G wireless communication network (115), the mobile station (135) completes a true 2G authentication (230) in the 2G wireless communication system (105).

12 Claims, 5 Drawing Sheets

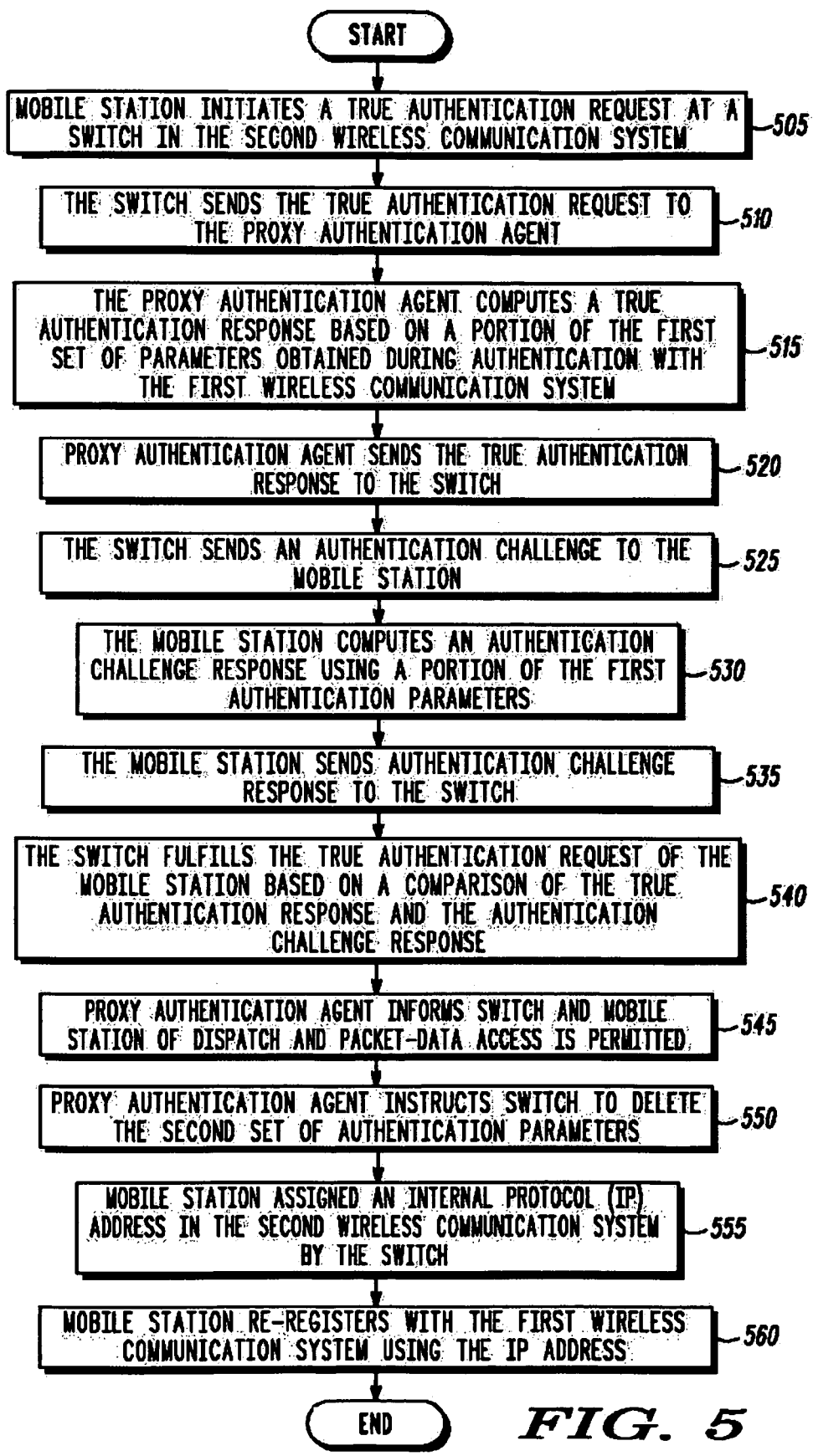

METHOD AND SYSTEM FOR LEVERAGING AN AUTHENTICATION ON ONE NETWORK TO OBTAIN AN AUTHENTICATION ON ANOTHER NETWORK

FIELD OF THE INVENTION

The present invention relates generally to authentication methods in a wireless communication network and more specifically for leveraging an established 3G authentication to obtain a 2G authentication.

BACKGROUND OF THE INVENTION

Several wireless communications networks such as third generation (3G) networks and second generation (2G) networks, have already been installed for use, while fourth generation (4G) networks will soon be in place. As more networks are installed, cellular networks will contain a mix of both old 2G systems and the new 3G and 4G compatible systems. When users roam between various cellular networks, authentication across various networks presents several shortcomings.

For present day 3G mobile systems a mobile station does an end-to-end authentication with the 3G server in the mobile station's home domain to enable communication within the 3G wireless communication system. While performing the authentication, the mobile station uses a shared secret with the 3G server (the shared 3G secret) and generates one or more shared secret 3G keys. The secret 3G keys may be used to encrypt the communications of the mobile station. They may be used by the 3G server or may be made available by the 3G server to trusted proxies in the communication path between the mobile station and the 3G server. The 3G authentication, being end-to-end, mutual authentication can be established between the mobile station and the home system.

In contrast to the secure, end-to-end 3G authentication, for present day 2G mobile systems, the mobile stations send an authentication request to an intermediary switch, which is a part of the visited 2G network, and the switch informs the Home Location Register (HLR) of the mobile station in the mobile station's home domain. The mobile station and the HLR have a shared 2G secret. The switch of the visited 2G network requests 2G authentication parameters from the HLR, and the authentication is accomplished between mobile station and the switch of the visited 2G domain, rather than between the mobile station and its home domain. Only the acknowledgement of authentication is sent from the switch to the HLR. The 2G authentication is not end-to-end. For example, it occurs only between the mobile station and the switch that is currently serving the mobile station. Thus, if the mobile station roams into another 2G network, the authentication is between the mobile station and a switch in the other 2G network. The HLR in the home network plays a minimal role in authenticating the mobile station in the new 2G network. A 3G mobile station may from time to time want to operate in a 2G systems, where the 2G systems may belong to independent operators. In each such 2G system, the mobile station would need a HLR and a shared 2G secret with each HLR. The need of a separate shared 2G secret for each 2G network causes a provisioning issue with the mobile stations.

Hence there is a need for leveraging an established 3G authentication to obtain a 2G authentication.

BRIEF DESCRIPTION OF THE DRAWINGS

Various embodiments of the invention are now described, by way of example only, with reference to the accompanying figures in which:

FIG. 5 shows a flow diagram for registering the mobile station in the second wireless communication system pursuant to an embodiment of the present invention.

DETAILED DESCRIPTION OF THE INVENTION

Figure 1:
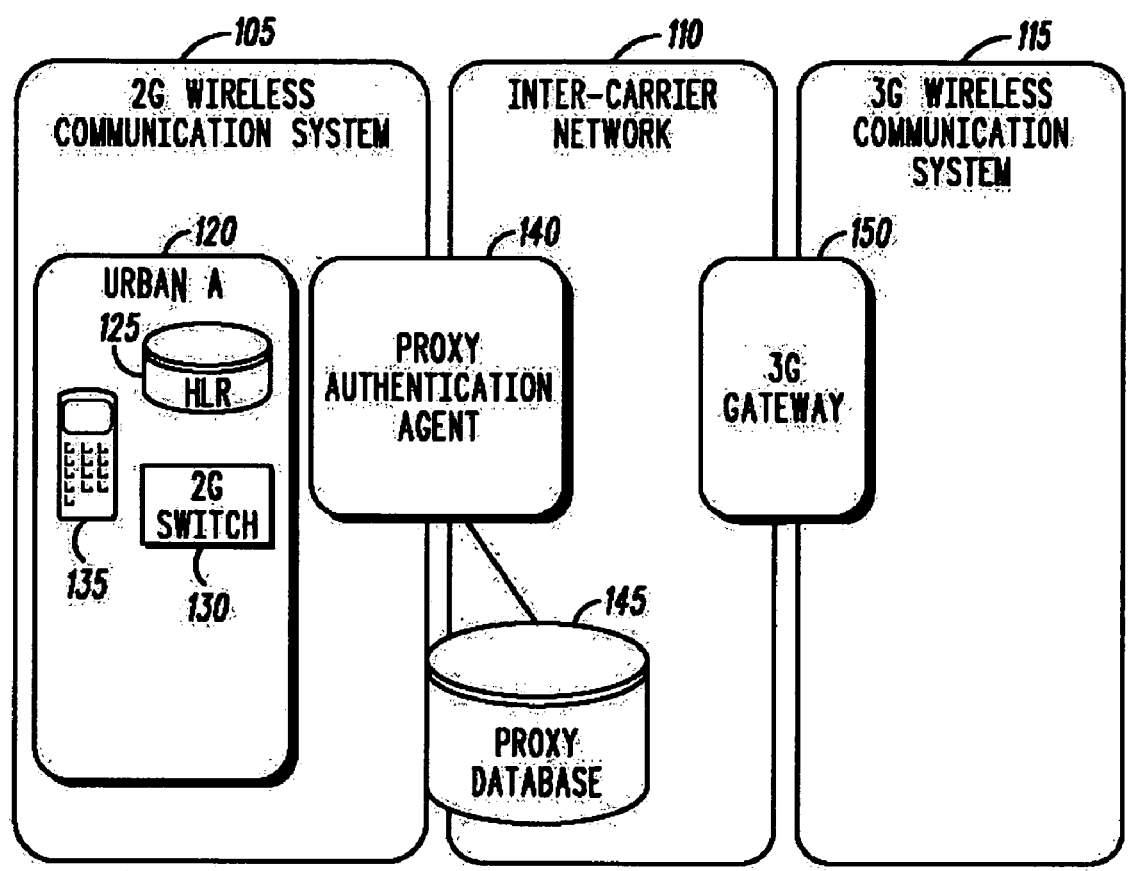
FIG. 1 illustrates a system where a mobile station roams from a first wireless communication system to a second wireless communication system pursuant to an embodiment of the present invention.

Before describing in detail embodiments that are in accordance with the present invention, it should be observed that the embodiments reside primarily in combinations of method steps and apparatus components related to a method and apparatus for leveraging an established 3G authentication to obtain a 2G authentication. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for leveraging an established 3G authentication to obtain a 2G authentication described herein. The non-processor circuits may include, but are not limited to, a radio receiver, a radio transmitter, signal drivers, clock circuits, power source circuits, and user input devices. As such, these functions may be interpreted as steps of a method for leveraging an established 3G authentication to obtain a 2G authentication described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

An embodiment of the present invention discloses a system and method wherein a wireless communication device, for example a mobile station connecting to a second wireless communication system after roaming from a first communication system is programmed to establish a provisional registration for the mobile station. The second wireless communication system is a 2G wireless communication system. A 2G wireless communication system can be one of an Integrated Digital Enhanced Network (iDEN), a Global System for Mobile Communication (GSM), a Time Division Multiple Access (TDMA) and a Code Division Multiple Access (CDMA) system. The provisional authentication results in the 2G wireless communication system providing authorization to the mobile station. The authorization may be made for limited functionality or may only last for a limited time period. The limited authorization is mainly used to allow the mobile station to do a regular 3G authentication with its home domain. A 3G authorization and/or authentication can be established using the Hyper Text Transfer Protocol (HTTP) or the Session Initiation Protocol (SIP) with a first wireless communication system. The first wireless communication system can, for example, be a 3G or 4G wireless communication system. The 3G wireless communication system, as known in the art, is a third-generation wireless communication system. 4G refers to the fourth-generation wireless communication devices and systems, the stage of broadband mobile communications that will follow the 3G.

As part of the regular 3G authentication, a proxy authentication agent obtains a secret 3G key from the 3G wireless communication system while the mobile station calculates the same secret 3G key using a shared secret 3G key associated with the trusted 3G home domain. The mobile station and the proxy authentication agent are then programmed to accomplish a true 2G authentication and authentication for the 2G wireless communication system. The true 2G authentication uses the secret 3G key obtained by the proxy authentication agent and derived by the mobile station previously during the 3G authentication as the shared 2G secret. Hence, a mobile station is authenticated in the 2G wireless communication system without having a pre-provisioned shared 2G secret that is associated with the 2G wireless communication system. The mobile station that has successfully authenticated with a first wireless communication system, for example a 3G/4G wireless communication system, that uses regular 3G authentication is provided access to the 2G wireless communication system.

FIG. 1 illustrates a system where a mobile station roams from a first wireless communication system to a second wireless communication system. The first wireless communication system can be the 3G wireless communication system 115 and the second wireless communication system can be the 2G wireless communication system 105 pursuant to an embodiment of the present invention. The wireless communication device comprises a transceiver and a processor, which are known in the art, and can be enabled to leverage the wireless communication device's 3G authentication to obtain a true 2G authentication as disclosed in detail below. The first wireless communication system 115 can be one of an Internet Protocol Multimedia System (IMS), Qchat, CDMA EV-DO (Code Division Multiple Access Evolution Data-Optimized), Universal Mobile Telecommunications System (UMTS) and a PTT over Cellular (PoC) system. The second wireless communication system 105 can be one of an Integrated Digital Enhanced Network (iDEN), Global System for Mobile Communication (GSM), Time Division Multiple Access (TDMA) and Code Division Multiple Access (CDMA) system.

In one embodiment, when a mobile station 135 roams into a 2G wireless communication system 105 from a 3G wireless communication system 115, the mobile station 135 can be allowed to operate in the 2G system without the need for an HLR in the 2G system and without the need for a shared 2G secret. Moreover, neither the 3G wireless communication system 115 nor a 3G gateway 150 need to generate authentication parameters to authenticate the mobile station 135 as the 2G registration is not end-to-end. A set of authentication parameters, also known as an authentication triplet, comprises a network challenge random number, a response and an encryption key that is normally provided by an HLR to the switch in a visited 2G system for the purpose of 2G authentication. The ability for the 3G mobile station 135 to operate in one or more 2G systems 105 without the need for a 2G secret eliminates the need for network operators to provide multiple shared 2G and 3G secrets for the single mobile station 135.

The mobile station 135 on roaming into a 2G wireless communication system 105 from a 3G wireless communication system 115 seeks to initiate a provisional registration with the 2G wireless communication system 105. In one embodiment, the mobile station 135 roams into a zone or an Urban A 120 of 2G wireless communication system 105. Those skilled in the art shall realize that there maybe several zones or Urban areas in several 2G wireless communication systems 105 such as Urban B, Urban C. For ease of depiction, only one such Urban 120 and one such 2G wireless communication system 105 is shown. The mobile station 135 would seek registration through an operator corresponding to the mobile station 135 operating in the 2G wireless communication system 105. The mobile station 135 is generally assigned a 2G home location register (HLR) 125 and a switch 130 in each 2G wireless communication system 105 the mobile station 135 roams into. The switch 130 can be a Visitor Location Register (VLR), for example a Global System for Mobile Communication (GSM) switch. Those skilled in the art may appreciate that there may be several 2G wireless communication systems that the mobile station can roam into, and FIG. 1 illustrates one 2G wireless communication system 105 as an example. The mobile station would be assigned a 2G switch in each 2G wireless communication system, which shall be used during registration.

The HLR 125 is a register within 2G wireless communication system 105 maintained by the mobile station's home carrier. The HLR 125 contains pertinent device information, including address, account status, and preferences of the mobile station 135. The switch 130 comprising the VLR maintains temporary information (such as the mobile station's current location) to manage the call setup requests for the mobile stations that are roaming out of their home domain. The mobile station 135 is connected based on the information contained in the HLR 125 and the VLR. Those skilled in the art shall appreciate that HLRs and VLRs are generally known in the art.

Now, as per an embodiment, the first phase of registration comprises obtaining a provisional 2G authentication with the 2G wireless communication system 105. The mobile station 135 sends a provisional 2G authentication request to the switch 130. The switch 130 is not aware that the registration request sent by the mobile station 135 is a provisional authentication request. The 2G authentication request can be a standard authentication request as it can be recognized by the switch 130. The switch 130 forwards the authentication request to the proxy authentication agent 140. In a system, for example, the proxy authentication agent 140 comprises a transceiver and a processor as is known in the art. The transceiver can be adaptively coupled with the processor to receive the provisional authentication request from the switch 130. The provisional authentication request comprises the request for the mobile station 135 to operate in the 2G wireless communication system 105. In one embodiment, the proxy authentication agent 140 serves as a home agent or an HLR for the mobile station 135. The proxy authentication agent 140 can be pre-configured to recognize the authentication request as a provisional authentication request and hence send a response similar to the response that would have been sent by a mobile station's HLR 125 to the switch 130 to support the provisional authentication for the mobile station 135. The provisional 2G authentication procedure has been disclosed in detail using FIG. 3. It is explained that the provisional 2G authentication does not require a shared 2G secret between the mobile station and the proxy authentication agent 140, but uses a fake (non-secret) shared 2G 'secret' instead. In other embodiments, the proxy authentication agent 140 may also be a SIP proxy, a PBX, or a data gateway for the mobile station 135 so that the communications of the mobile station with other networks, such as the 3G wireless communication system 115 will pass through the proxy authentication agent 140. This way the proxy authentication agent 140 can inspect, filter or alter the mobile station's 135 traffic during the later phases disclosed below.

Those skilled in the art shall realize that multiple 2G wireless communication systems can also be connected to each other using an inter-urban wireless access network. The multiple 2G wireless networks may have several proxy authentication agents that are in communication with each 2G wireless communication system such that they can have a common database, for instance a proxy database 145, storing information of each mobile station that has been authenticated within the 2G wireless communication system 105. The stored information can be used to enable the provisional authentication for the mobile stations and may consist of the identities of those mobile stations that are allowed to use provisional authentication or have already used provisional authentication. The proxy authentication agent 140 can provide packet data service to the mobile station 135 once the mobile station's 135 provisional authentication with the 2G wireless communication system 105 is completed. The packet data service enables the mobile station 135 to communicate with the first wireless communication network (the network from which the mobile station roamed), for example the 3G/4G wireless communication network.

The mobile station is now in the second phase of the authentication process. During the second phase, the mobile station 135 uses the services of the proxy authentication agent 140 provided by the 2G system 105 under provisional authentication to negotiate a 3G or Session Initiation Protocol (SIP) authentication with its 3G/4G home domain, for example the 3G wireless communication system 115. This authentication is standard and is based on a shared 3G secret that is shared between the mobile station 135 and the 3G wireless communication system 115. The shared 3G secret is also used by the mobile station 135 when authenticating with the 3G wireless communication system 115 while the mobile station 135 is operating in the 3G wireless communication system 115. Conventionally, a shared 3G secret is unique to the mobile station 135 for use during authentication with any 3G/4G wireless communication network. The shared 3G secret is unknown to any 2G wireless communication system.

Pursuant to an embodiment, during this second phase, the proxy authentication agent 140 enables the mobile station 135 to authenticate with the 3G wireless communication system 115. In the process, the proxy authentication agent 140 acquires a secret 3G key such as an encryption key from the 3G wireless communication system 115 that can be used for the true 2G authentication (third phase) of the mobile station. The negotiation of the 3G authentication is disclosed in detail using FIG. 4. The secret 3G key is generated by the 3G wireless communication system 115 based on the shared 3G secret known to the 3G wireless communication system 115 and the mobile station 135. The proxy authentication agent 140 communicates with the 3G wireless communication system 115 via an Inter-carrier network 110. In an embodiment of the invention, the inter-carrier network 110 can be an IP-based or SS7-based Wide Area Network. Once the secret 3G key has been obtained and the 3G authentication process has been completed, the proxy authentication agent 140 may inform the 2G wireless communication system 105 that the provisional 2G authentication that had been previously established has now been terminated and that the 2G wireless communication system 105 must remove any unused sets of authentication parameters corresponding to the mobile station 135.

In a third phase, the mobile station 135 and the proxy authentication agent 140 are ready to complete a true 2G authentication in the 2G wireless communication network 105. Instead of using the fake shared 2G secret as is done during the provisional 2G registration, the proxy authentication agent 140 and the mobile station 135 now use a secret 3G key as the shared 2G secret for authentication in the 2G wireless communication system 105, the shared 2G secret being known to the proxy authentication agent and the mobile station. The shared 2G secret is received by the proxy authentication agent 140 from the 3G wireless communication network and derived by the mobile station 135 from the authentication parameters used in the second phase, such as one or more secret 3G key, using the same algorithm. Once again, with respect to the 2G switch 130, the proxy authentication agent 140 plays the role of the mobile station's 135 HLR. This time the proxy authentication agent 140 knows the mobile station 135 and shares a shared 2G secret with the mobile station 135, such as the encryption key received from the 3G wireless communication network, computes a 2G challenge and a 2G response using the shared 2G secret, and sends challenge and response to the switch 130, just as was done in the first phase. Once again, the switch 130 forwards the 2G challenge to the mobile station 135. The mobile station 135 computes the 2G response using the shared 2G secret, and forwards the response to the switch 130. The switch 130 receives a similar response from the proxy authentication agent 140 and the mobile station 135 so that the switch 130 can authenticate and register the mobile station 135. Thus, the mobile station 135 has now completed a true 2G authentication by independently deriving the response to a 2G authentication challenge using the shared 2G secret, which will match with the response generated by the proxy authentication agent 140. The proxy authentication agent 140 can now allow the mobile station 135 to operate normally, for example make phone calls, dispatch calls or use packet data sessions and may provide the mobile station 135 with an Internet Protocol (IP) address. The details of the true 2G authentication has been disclosed using FIG. 5

Figure 2:
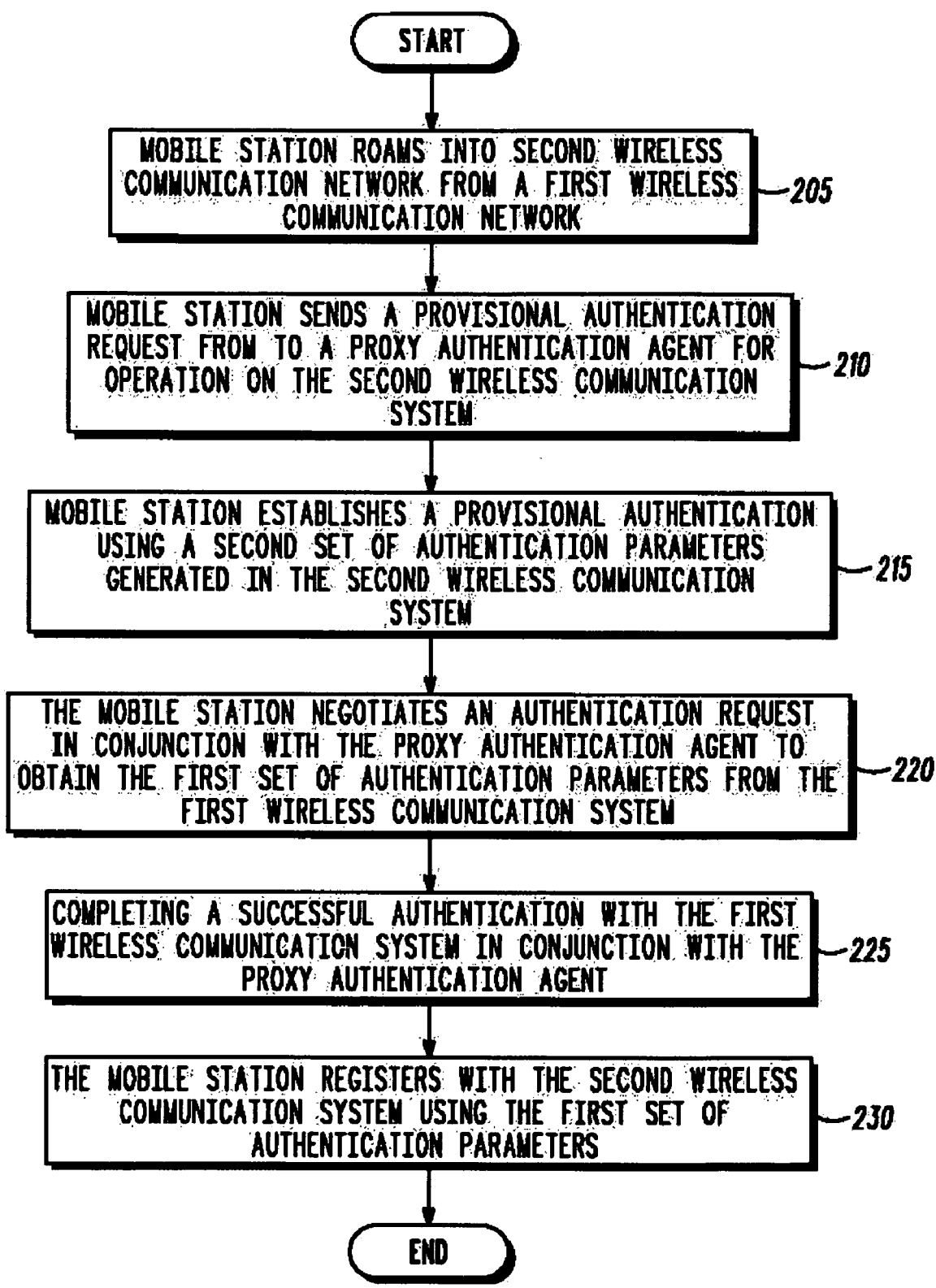
FIG. 2 shows a flow diagram for registering a mobile station in a second wireless communication system based on 3G authentication pursuant to an embodiment of the present invention.

Turning now to FIG. 2, a flow diagram is shown of a method of authenticating and registering a mobile station 135 in a second wireless communication system based on an authentication with a first wireless communication system pursuant to an embodiment of the present invention. As per one embodiment, the first wireless communication system can be a 3G/4G wireless communication system and the second wireless communication system can be a 2G wireless communication system. On roaming into the 2G wireless communication system 105 from the 3G wireless communication system 115, step 205 the mobile station 135 sends a provisional authentication request to a proxy authentication agent, step 210. Following a procedure detailed using FIG. 3, the mobile station 135 establishes a provisional authentication with the 2G wireless communication system 105, step 215. The provisional authentication enables the mobile station 135 to obtain packet-data access to the first wireless communication system, namely the 3G wireless communication system 115. The mobile station 135 initiates an authentication request for authenticating with the 3G wireless communication system 115 via the proxy authentication agent 140.

The mobile station 135 negotiates an authentication request with the 3G wireless communication system 115 to obtain the first set of authentication parameters based on the provisional 2G authentication. The authentication parameters are used by the mobile station and the authentication proxy agent to compute a shared 2G secret that is then used for a true 2G authentication with the 2G wireless communication system 105. The mobile station 135 at step 230 authenticates and registers to the 2G wireless communication system 105 using the first set of authentication parameters. The mobile station uses the first set of authentication parameters to obtain or compute the shared 2G secret. The proxy authentication agent 140 provides a conduit between the 2G wireless communication system 105 and the 3G wireless communication system 115.

After the completion of step 215, based on the provisional authentication obtained, the mobile station 135 can negotiate a 3G authentication request in conjunction via the proxy authentication agent 140 with the 3G wireless communication system 115. While negotiating the 3G authentication, the mobile station 135 obtains a first set of authentication parameters from the 3G wireless communication system 115 while communicating via the 2G system based on the provisional 2G authentication, step 220. The mobile station completes a successful authentication with the 3G wireless communication system, step 225 and initiates a true 2G authentication in conjunction with the proxy authentication agent based on the first set of authentication parameters received from the 3G wireless communication system 115. The mobile station 135 can authenticate with the 2G wireless communication system 115 based on the first set of authentication parameters, step 230, by selecting or computing the first set of authentication parameters. The authentication may be done as part of a new registration of the mobile station 135 with the 2G wireless communication system 115. On completion of the true authentication with the 2G wireless communication system 105, the mobile station 135 can be assigned an Internet Protocol (IP) address and permitted to send dispatch messages and/or to make calls. Hence, a system, for example a proxy authentication agent, enables the mobile station to leverage the 3G authentication to obtain a true 2G authentication while the mobile station operates in the 2G network.

Figure 3:
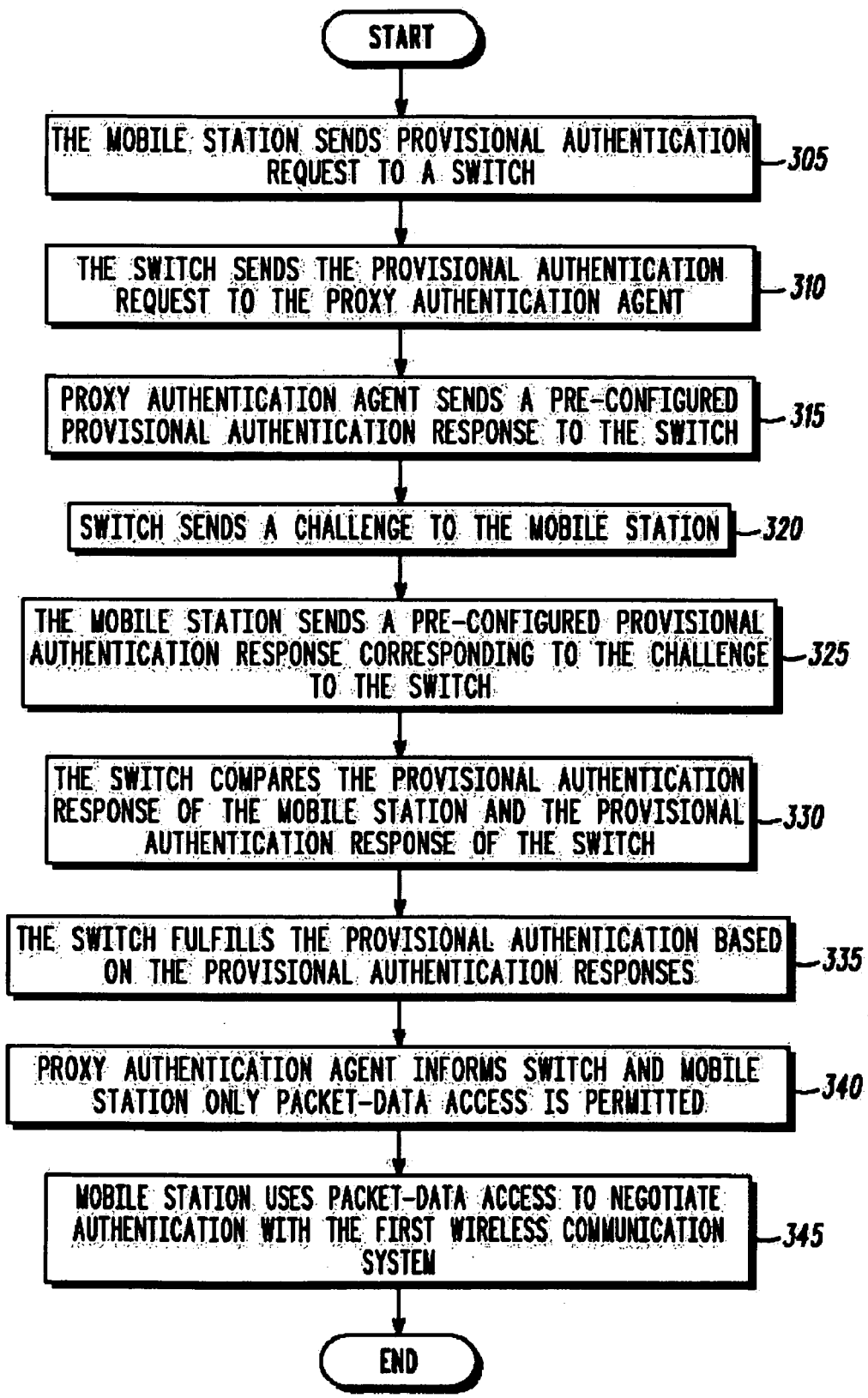
FIG. 3 shows a flow diagram for establishing a provisional authentication in a second wireless communication system pursuant to an embodiment of the present invention.

Turning now to FIG. 3, this figure shows a flow diagram of a method for establishing a provisional authentication in a second wireless communication system pursuant to an embodiment of the present invention. As per one embodiment, the second wireless communication system 105 can be a 2G wireless communication system 105. The mobile station 135 initiates a provisional authentication on roaming into the 2G wireless communication system 105 by sending a provisional authentication request, step 305. The mobile station can send the provisional authentication request to a switch 130 within the 2G wireless communication system 105. A switch comprises Visiting Location register (VLR) comprising information pertaining to visiting mobile stations roaming into the 2G wireless communication system 105.

The switch 130 forwards the provisional authentication request to the proxy authentication agent 140, step 310. In an embodiment, Global Title Translation (GTT) routing mechanisms are used to route the authentication request to the proxy authentication agent 140. The GTT indicates to the switch 130 that the proxy authentication agent 140 is the mobile station's 135 HLR. The proxy authentication agent 140 sends a second set of authentication parameters to the switch 130. In one embodiment, the second set of authentication parameters comprises an authentication challenge, an authentication response to the challenge based on a shared 2G secret, and a shared secret 2G key, such as an encryption key. Since, the authentication is a provisional authentication for the mobile station 135, no shared 2G secret exists between the proxy authentication agent 140 and the mobile station 135. A fake, (non-secret) shared 2G secret is used for the provisional authentication that can be known by a plurality of mobile stations and the proxy authentication agent 140. Hence, the fake or provisional shared 2G secret can be used to establish provisional authentications for a plurality of mobile stations. The proxy authentication agent 140 generates a pre-configured response based on the fake shared 2G secret to the provisional authentication request received from the switch 130, step 315. For example, the proxy authentication agent 140 sets the challenge sent to the switch 130 to a reserved value that the mobile station 135 can recognize. For example, the provisional authentication challenge can be set to 0. The proxy authentication agent 140 computes a provisional authentication response and the encryption key as if the shared 2G secret is a pre-configured shared 2G secret, that is pre-configured to the same value in both the proxy authentication agent 140 and the mobile station 135. The pre-configured shared 2G secret is a reserved value that is also known to the mobile station 135, for example 0, or the International Mobile Station Identity (IMSI) of the mobile station 135. The expected provisional authentication response can easily be determined in the same way by the proxy authentication agent 140 and by the mobile station 135.

The switch 130 now sends the challenge to the mobile station 135, step 320. When the mobile station 135 receives the authentication challenge with the reserved value from the switch 130, the mobile station 135 computes the provisional authentication response as if the pre-configured shared 2G secret were of the reserved value (for example 0) and sends the provisional authentication response to the switch 130, step 325. The switch 130 compares the provisional authentication responses received from the proxy authentication agent 140 and the mobile station 135. Since, the provisional authentication responses were pre-configured to be similar, the switch considers the provisional authentication to be successful, and concludes the provisional authentication, step 335.

The authentication is provisional. Because the way that the provisional authentication response is generated, the authentication can be known to a plurality of mobile stations, some of which may be rogue devices. For this reason the provisional authentication allows only limited functionality and may only be valid for a limited time. Therefore, the proxy authentication agent 140 further informs the switch 130 and the mobile station 135 that limited access, for instance, only packet data can be permitted while voice calls and/or dispatch calls are forbidden. The packet-data access is provided to enable the mobile station 135 to contact the first wireless communication system 115. In one embodiment, the 2G wireless communication system 105 can impose a limited lifetime for the provisional authentication. Alternatively, the proxy authentication agent 140 can force termination of the provisional authentication after a limited lifetime elapses. In another embodiment of the invention, the proxy authentication agent 140 can also instruct the mobile station 135 to use a specific Domain Name Service (DNS) to identify packet data services provided by the 2G wireless communication system 105. To prevent a rogue mobile station from abusing the packet data rights, the proxy authentication agent 140 assigns a temporary mobile-IP home address to the mobile station 135 and specifies that the proxy authentication agent 140 correspond to the mobile station's 135 mobile IP home agent. The proxy authentication agent 140 can then monitor all packet data traffic associated with the mobile station 135.

Figure 4:
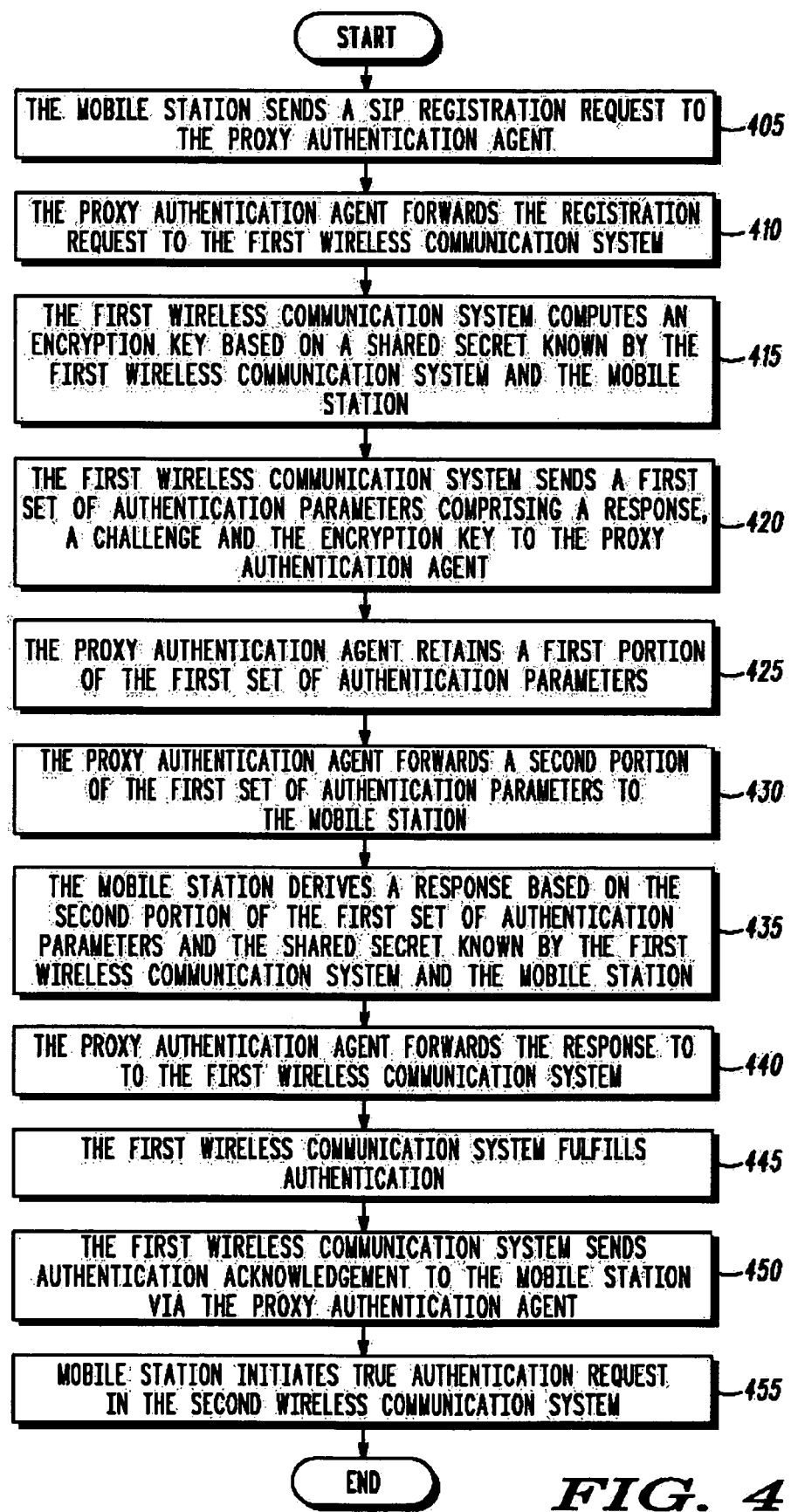
FIG. 4 shows a flow diagram for negotiating a 3G authentication pursuant to an embodiment of the present invention.

FIG. 4 shows a flow diagram for negotiating a 3G authentication pursuant to an embodiment of the present invention. This authentication is standard and is based on a shared 3G secret that is shared between the mobile and a first wireless communication system. The mobile station 135 can be programmed to do a Session Initiation Protocol (SIP) based registration that includes authentication with the first wireless communication system after it succeeds with the provisional authentication in the 2G wireless communication system 105. As per one embodiment, the purpose of the 3G authentication can be for obtaining the first set of authentication parameters from the 3G wireless communication network to complete a true 2G authentication. The mobile station 135 can use a Domain Name Server (DNS) to find an outbound SIP proxy to contact the 3G wireless communication system 115. The DNS would generally be programmed to return the same proxy authentication agent 140 that was involved during the provisional authentication process. The mobile station 135 indicates that a new SIP registration that includes 3G authentication is required and initiates the 3G authentication by sending a SIP registration request to the proxy authentication agent 140, step 405. The mobile station 135 includes information that allows the proxy authentication agent 140 to recognize the mobile station 135 as the same mobile station 135 that had completed the provisional 2G authentication. As per one embodiment, the mobile station 135 can insert a portion of the second set of authentication parameters, for instance the provisional 2G authentication parameters corresponding to the mobile station 135, in a private identification field. Alternatively, the mobile station 135 can include the previously assigned fake shared 2G secret as a special header, in a "from" header or the "contact" header, or include its International Mobile Station identity (IMSI) as a unique identification of the mobile station.

The proxy authentication agent 140 forwards the SIP registration to the first wireless communication network 115, for instance a 3G wireless communication network, step 410. The proxy authentication agent 140 routes the registration request message towards the specified SIP registrar in the mobile station's 135 3G wireless communication system 115. The 3G wireless communication system 115 will need to SIP authenticate the mobile station 135 and return an unauthorized message or another message, to indicate that the mobile station must be authenticated. The 3G wireless communication system 115 shall send 415 the first set of authentication parameters to the proxy authentication agent 140. The first set of authentication parameters comprises an authentication request comprising the challenge and secret 3G keys, such as an encryption key for the mobile station 135. Secret 3G keys are computed based on the shared 3G secret, which is persistently shared between the mobile station 135 and the 3G wireless communication network 115, step 415. According to the standard known in the art, the shared 3G secret is unique for the mobile station 135. The shared 3G secret remains unknown to any other 2G system entity. In particular, there is no need for the proxy authentication agent 140 to know the shared 3G secret. The 3G wireless communication system sends the first set of authentication parameters to the proxy authentication agent 140, step 420.

The proxy authentication agent 140 retains a first portion of the first set of authentication parameters from the unauthorized message sent by the 3G wireless communication system 115 step 425. In one embodiment, the first portion of the first set of authentication parameters contains one or more secret 3G keys, and the proxy authentication agent 140 selects one of the secret 3G keys, such as the encryption key, to be used as an authentication secret. The proxy authentication agent 140 may also compute the authentication secret based on one or more secret 3G keys, by using an algorithm that is also known and used to the mobile station 135. The proxy authentication agent 140 forwards the second portion of the first set of authentication parameters, step 430 to the mobile station. The second portion of the first set of authentication parameters can comprise the challenge. While forwarding the second portion of the first set of authentication parameters, the proxy authentication agent 140 may also provide a SIP dispatch contact address to the mobile station 135. The address may vary based on the proxy authentication agent 140 that the mobile station 135 is connected through.

The mobile station 135 can now derive 435 a response based on the challenge sent by the proxy authentication agent 140 and the shared 3G secret known by the mobile station and the 3G wireless communication network. Hence, the mobile station 135 can derive one or more of the secret 3G keys, such as the encryption key, and select one of the 3G keys to be used as an authentication secret, step 435. The mobile station 135 may also compute the authentication secret based on one or more secret 3G keys, by using an algorithm that is also known and used to the proxy authentication agent 140. The mobile station 135 retains the authentication secret and secret 3G keys and sends 430 a response to the proxy authentication agent 140. The proxy authentication agent 140 forwards the response to the 3G wireless communication system 115, step 440.

The 3G wireless communication system 115 checks the response received from the mobile station 135 and fulfills the 3G authentication, step 445. Since the response has been computed using a same shared 3G secret, the 3G authentication of the mobile station 135 will succeed and is completed. When the proxy authentication agent 140 receives the response for authentication acknowledgement from the 3G wireless communication system 115, the proxy authentication agent forwards the authentication acknowledgement to the mobile station 135, step 450. Now as a result of the 3G authentication, the mobile stations 135 as well as the proxy authentication agent obtain their own copies of the secret 3G keys, such as the encryption key. The proxy authentication agent 140 informs the mobile station 135 to initiate a true 2G authentication, step 455.

FIG. 5 shows a flow diagram for registering the mobile station 135 in the second wireless communication system after completion of authentication with the first wireless communication system pursuant to an embodiment of the present invention. Once the mobile station 135 obtains the authentication secret, such as the secret 3G keys, the mobile station 135 can initiate a true 2G authentication with the same switch 130 the mobile station 135 used while obtaining a provisional 2G authentication. Based on several parameters, such as load sharing, proximity to mobile station 135 and configurations of the switch 130, an appropriate other switch can also be assigned for true 2G registration. Those skilled in the art may appreciate that the switch for true 2G registration can be changed from the previous switch 130 used during provisional authentication as long as the same proxy authentication agent 140 is being used.

The mobile station 135 sends a registration request for a true 2G registration to a switch 130, step 505. The switch 130 forwards the true 2G authentication request to the proxy authentication agent 140, step 510. The proxy authentication agent 140 recognizes the authentication request is associated with the mobile station 135 and ascertains that the same mobile station that had obtained provisional authentication is seeking true 2G authentication. The proxy authentication agent 140 computes a true 2G authentication response using a portion of the first set of the authentication parameter, step 515. In one embodiment, the portion of the first set of authentication parameters can be one of the secret 3G keys received from the 3G wireless communication system 115. The proxy authentication agent 140 sends a true 2G authentication response corresponding to the true 2G authentication request to the switch 130, step 520. The 2G authentication response comprises a challenge and a shared secret 2G key. However, during true 2G authentication, the proxy authentication agent 140 preferably uses a random challenge that is not equal to the reserved challenge value and computes the response as if the shared 2G secret is the authentication secret, such as one of the secret 3G keys obtained during the 3G authentication based on the messages received while negotiating the 3G authentication.

The switch 130 forwards the challenge received from the proxy authentication agent 140 to the mobile station 135, step 525. Now the mobile station 135 receives a challenge that is not equal to the reserved challenge value, and hence computes an authentication challenge response based on a portion of the first set of authentication parameters, using the authentication secret, such as one of the secret 3G keys, as the shared 2G secret, step 530. Hence, the authentication challenge response is computed indirectly based on the shared 3G secret known by the 3G wireless communication system 115 and the mobile station 135. The mobile station 135 sends the authentication challenge response to the switch 130, step 535. The switch 130 receives the authentication challenge response from the mobile station 135 and compares the authentication challenge response with the true 2G authentication response received from the proxy authentication agent 140. The switch fulfills the true 2G authentication of the mobile station 135, step 540. During this 2G registration, the proxy authentication agent provides a subscriber provisioning profile that allows the mobile station to do dispatch and Packet Data since the mobile station has completed a true 2G authentication in the 2G wireless communication system, step 545.

In one embodiment, once the mobile station 135 completes the true 2G authentication, the second set of authentication parameters, for example the challenge and the shared secret 2G key used by the proxy authentication agent 140 and the mobile station 135, can be deleted from the system, step 555. In another embodiment, the proxy authentication agent can use Dynamic Host Configuration Protocol (DHCP) to get a Mobile-IP address for the mobile station and assigns a home agent, or the proxy authentication agent may allow the mobile station to continue the previously assigned IP address and home agent, step 555. Generally, different proxy authentication agents 140 share a common database, for instance a proxy database 145. During true 2G authentication the proxy authentication agent inserts an identifier for the switch 130 corresponding to the mobile station 135 in that proxy database 145. If the mobile station roams out of the 2G wireless communication system 105 and later roams in again, the proxy authentication agent 140 can find the previous switch 130 in the database assigned to the mobile station 135 and issue a cancel location if the mobile station 135 is now using another switch. This corresponds to behavior that is normally implemented on an HLR.

Having succeeded with true 2G authentication, the mobile station 135 may have a new IP address. In that case it can do a new SIP registration with the 3G wireless communication system, step 560. Again, the mobile station 135 may query the Domain Name Server (DNS) to get the local outbound proxy, or it may use the previous proxy authentication agent 140. The DNS can again force the mobile station to use the local proxy authentication agent 140 as the outbound proxy. Since the mobile station has already authenticated with the 3G wireless communication network 115, the 3G wireless communication network 115 will return an authentication successful message and the proxy authentication agent 140 can forward authentication successful message to the mobile station 135 to complete the SIP registration with the 3G wireless communication system 115.

Hence, the mobile station is able to leverage the authentication of the 3G wireless communication system to obtain an authentication on the 2G wireless communication system.

In the foregoing specification, specific embodiments of the present invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of registering a mobile station operating in a second wireless communication system based on a first set of authentication parameters corresponding to an authentication of the mobile station on a first wireless communication system, the method comprising the steps of:
    receiving a provisional authentication request from the mobile station at a proxy authentication agent for operation on the second wireless communication system;
    establishing a provisional authentication for the mobile station using a second set of authentication parameters, the second set of authentication parameters generated in the second wireless communication system wherein the establishing step comprises:
        sending the provisional authentication request from the switch to the proxy authentication agent;
        receiving a provisional authentication response comprised in the second set of authentication parameters at the switch from the proxy authentication agent;
        receiving a provisional authentication response at the switch from the mobile station; and
        fulfilling the provisional authentication for the mobile station based on the provisional authentication response received from the mobile station and the provisional authentication response received from the proxy authentication agent;
    negotiating an authentication request in conjunction with the mobile station to obtain the first set of authentication parameters from the first wireless communication system based on the provisional authentication;
    sending the first set of authentication parameters from the first wireless communication system to the proxy authentication agent in response to the authentication request;
    retaining a first portion of the first set of authentication parameters at the proxy authentication agent;
    forwarding a second portion of the first set of authentication parameters to the mobile station in response to the authentication request;
    deriving an authentication secret at the mobile station and at the proxy authentication agent based on a predetermined procedure performed using the second portion of the first set of authentication parameters;
    sending an authentication response to the first wireless communication system via the proxy authentication agent;
    sending an authentication acknowledgement to the mobile station in response to the authentication response, and
    authenticating the mobile station in the second wireless communication system using the first set of authentication parameters and the authentication secret.

2. The method of claim 1, wherein the second set of authentication parameters comprises a challenge and a response based on a shared 2G secret.

3. The method of claim 2, wherein the shared 2G secret is used to establish provisional authentications for a plurality of mobile stations.

4. The method of claim 1, wherein the provisional authentication response received from the mobile station and the provisional authentication response received from the proxy authentication agent are based on a pre-configured shared 2G secret known by the proxy authentication agent and the mobile station.

5. The method of claim 1, wherein the authentication request uses a session initiation protocol (SIP).

6. The method of claim 1, wherein the first set of authentication parameters comprises a challenge and an encryption key.

7. The method of claim 1, wherein the authenticating step further comprising:
    receiving a true authentication request at a switch in the second wireless communication system;
    forwarding the true authentication request to the proxy authentication agent;
    sending a true authentication response in response to the true authentication request from the proxy authentication agent to the switch, the true authentication response being computed at the proxy authentication agent using a first portion of the first set of authentication parameters;
    sending an authentication challenge to the mobile station;
    computing an authentication challenge response at the mobile station using a second portion of the first set of authentication parameters;
    sending the authentication challenge response from the mobile station to the switch; and
    fulfilling the true authentication request of the mobile station at the switch based on a comparison of the true authentication response received from the proxy authentication agent and the authentication challenge response received from the mobile station.

8. The method of claim 1, wherein the proxy authentication agent is at least one of a home agent, and a session initiation protocol (SIP) outbound proxy for the mobile station.

9. The method of claim 1, further comprising:
    deleting the second set of authentication parameters before authenticating the mobile station in the second wireless communication system using the first set of authentication parameters.

10. The method of claim 1, further comprising:
    providing an Internet Protocol (IP) address to the mobile station on completing the registration in the second wireless communication system.

11. The method of claim 10, further comprising:
    re-registering the mobile station with the first wireless communication system using the IP address.

12. A method of registering a mobile station operating in a second wireless communication system based on a first set of authentication parameters corresponding to an authentication of the mobile station on a first wireless communication system, the method comprising the steps of:
    receiving a provisional authentication request from the mobile station at a proxy authentication agent for operation on the second wireless communication system;
    establishing a provisional authentication for the mobile station using a second set of authentication parameters, the second set of authentication parameters generated in the second wireless communication system;
    negotiating an authentication request by sending a Session Initiation Protocol registration request from the mobile station to the first wireless communication system to obtain the first set of authentication parameters from the first wireless communication system based on the provisional authentication; and
    authenticating the mobile station in the second wireless communication system using the first set of authentication parameters wherein the step of authenticating the mobile station includes:
        receiving a true authentication request at a switch in the second wireless communication system;
        forwarding the true authentication request to the proxy authentication agent;

sending a true authentication response in response to the true authentication request from the proxy authentication agent to the switch, the true authentication response being computed at the proxy authentication agent using a first portion of the first set of authentication parameters;

sending an authentication challenge to the mobile station;

computing an authentication challenge response at the mobile station using a second portion of the first set of authentication parameters;

sending the authentication challenge response from the mobile station to the switch; and fulfilling the true authentication request of the mobile station at the switch based on a comparison of the true authentication response received from the proxy authentication agent and the authentication challenge response received from the mobile station.

\* \* \* \* \*